(12) United States Patent
Dong et al.

(10) Patent No.: US 12,337,363 B2
(45) Date of Patent: Jun. 24, 2025

(54) METHOD FOR CONTROLLING HEAVY METAL SCOURING POLLUTION IN MINES BY USING HUMIFIED PRODUCT

(71) Applicant: TONGJI UNIVERSITY, Shanghai (CN)

(72) Inventors: Bin Dong, Shanghai (CN); Zuxin Xu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 734 days.

(21) Appl. No.: 17/726,534

(22) Filed: Apr. 22, 2022

(65) Prior Publication Data

US 2023/0036097 A1   Feb. 2, 2023

(30) Foreign Application Priority Data

Jul. 28, 2021   (CN) .......................... 202110853644.5

(51) Int. Cl.
*B09C 1/10*     (2006.01)
*C02F 11/02*    (2006.01)

(52) U.S. Cl.
CPC ............... *B09C 1/10* (2013.01); *C02F 11/02* (2013.01)

(58) Field of Classification Search
CPC .................................. B09C 1/10; C02F 11/02
USPC ...................................................... 435/262.5
See application file for complete search history.

(56) References Cited

U.S. PATENT DOCUMENTS 10,457,612 B1   10/2019   Tian et al.

FOREIGN PATENT DOCUMENTS

| CN | 102319726 | | 1/2012 | |
|----|-----------|---|--------|---|
| CN | 102636466 | | 8/2012 | |
| CN | 102657925 | | 9/2012 | |
| CN | 103495602 | | 1/2014 | |
| CN | 104087648 | | 10/2014 | |
| CN | 104829075 | | 8/2015 | |
| CN | 106905980 | | 6/2017 | |
| CN | 106905980 A | * | 6/2017 | ............... B09C 1/10 |
| CN | 111909708 | | 11/2020 | |

OTHER PUBLICATIONS

CN-106905980-A Machine English Translation (Year: 2017).*

* cited by examiner

*Primary Examiner* — Michael L Hobbs
*Assistant Examiner* — Lenora A Abel
(74) *Attorney, Agent, or Firm* — JCIP GLOBAL INC.

(57) ABSTRACT

The present application is related to a method for controlling heavy metal scouring pollution in mines by using a humified product, which comprises steps of: (1) carrying out mixed fermentation on sludge and hyperthermophiles to breed polar humified groups, and then carrying out mixed fermentation on the fermented material and a native material of humus precursors to induce massive production of humus until the humus content reaches a required standard; and (2) mixing and maintaining the humified product of the sludge reaching the standard with mine soil polluted by heavy metals to remedy the polluted mine.

9 Claims, 3 Drawing Sheets

METHOD FOR CONTROLLING HEAVY METAL SCOURING POLLUTION IN MINES BY USING HUMIFIED PRODUCT

CROSS-REFERENCE TO RELATED APPLICATION

This application claims the priority benefit of China application serial no. 202110853644.5, filed on Jul. 28, 2021. The entirety of the above-mentioned patent application is hereby incorporated by reference herein and made a part of this specification.

BACKGROUND OF THE INVENTION

1. Technical Field

The disclosure belongs to the field of organic solid waste treatment and reclamation technology, and particularly relates to a method for controlling heavy metal scouring pollution in mines by using a humified product.

2. Background of Related Art

Mines are rich in a wide variety of heavy metal resources with wide distribution and large reserves. Mining has brought rich resources and benefits to human beings, but large-scale mining activities have also caused serious damage to the environment. After mining, exposed mines, mine dump, subsidence areas and other industrial and mining areas containing high concentrations of heavy metals undergo long-term natural oxidation, rain wash and weathering of solid mine waste. As a result, heavy metals in the mines enter the environment or ecological system in various chemical forms, which, together with the lack of biodegradability of heavy metals, makes the heavy metals migrate and become gradually enriched in the environment or ecological system. The massive enrichment of heavy metals in unstable chemical forms may affect the metabolism of microorganisms or animals and plants in the mine soil and affect their growth and development, and may enter the human body through the mine soil, animals and plants, causing great harm to human health. Therefore, how to effectively remedy polluted mining areas polluted by heavy metals is an urgent problem to be solved in the current ecological environment protection.

At present, there are mainly two ways for mine remediation. One is to apply conditioners to change the existing state of heavy metals to inactivate them and reduce their biological toxicity. The second is to absorb heavy metals by using plants which are then processed to collect the heavy metals. However, the passivation effect of common soil conditioners on heavy metals is limited, they could only play a temporary inhibition role, and they may suffer bioaccumulation after being used too long. Additionally, the process of phytoremediation is relatively complex, and in the extraction process, heavy metals need to be changed into soluble and free states before leaching and collection, which also causes secondary pollution. It can be seen that the optimal method for mine remediation is to induce the migration of heavy metals to the mineralized state (residual state) to optimize the passivation of heavy metals.

Therefore, it is necessary to develop an induction conditioner with low cost and good effect that does not damage soil structure and is easily implemented to realize the re-mineralization and fixation of unstable heavy metals in mines.

Patent CN 106905980 B discloses a heavy metal sludge soil remediation agent, a method for preparing the same and an application of the same in sludge disposal, and the technical solution adopted therein is as follows: urban sludge is preliminarily treated, thermophiles are used to decompose organic matters, microorganisms for heavy metal treatment are inoculated; and the sludge is treated with the sludge remediation agent; the proportional effective removal rate of various pollutants in soil reaches more than 95%, which meets national standards. Also, vitriol can repair heavy metal land in situ and it is also a good organic fertilizer, which is beneficial to agricultural production and reduces the use of chemical reagents and chemical fertilizers, thereby eliminating pollution sources and secondary pollution from the origin.

However, this patent mainly focuses on the acclimation method of sludge microorganisms and the modification of soil sludge, whereas the compositions and related index contents of the soil and the mine soil are different. This patent has no requirement on sludge directed humification fermentation. The disclosure first proposes a method to apply humified products on mine soil, which focuses on accelerating the breeding of polar humified groups, and humification is multiplied after a polar humification core substance is added to induce fermentation. Also, the disclosure first proposes a quantitative standard for judging the content of humified polar functional groups, thereby enhancing mine soil remediation effect.

SUMMARY OF THE INVENTION

In view of the urgent need on remediation of heavy metal scouring pollution in mines, an objective of the disclosure is to provide a method for controlling heavy metal scouring pollution in mines by using a humified product. The method of the disclosure has the advantages of high feasibility, simple operation, high controllability and high flexibility, and realizes the win-win of environmental protection and economic benefits.

The objective of the disclosure is achieved by the following technical solution:

A method for controlling heavy metal scouring pollution in mines by using a humified product, comprising steps of:

(1) directed humification fermentation of sludge: sludge and a hyperthermophile undergo primary mixed fermentation to breed polar humified groups, and the fermented material and a native material of humus precursors undergo secondary mixed fermentation to induce massive production of humus, thereby preparing a modified humified product; after the total humus content (characterized by humified carbon content) and the soluble humus content of the sludge are both determined to reach the standard, remediation of heavy metal scouring pollution in mines can be carried out; the hyperthermophile is one or more of *Thermus* sp., *Geobacillus* sp., and *Calditerricola* sp.; wherein the standard refers to the total humus content (characterized by humified carbon content) is in the range of 120-250 mg/g VS, and the soluble humus content of the sludge is in the range of 25-60 mg/g VS;

(2) remediation of heavy metal scouring pollution in mines by the modified humified product: the humified product of the sludge reaching the standard and mine soil polluted by heavy metals are mixed and maintained to remedy the polluted mine.

Preferably, in step (1), when the sludge and the hyperthermophile undergo mixed fermentation, the sludge is controlled to have an initial water content of 45-55 wt % and an organic matter content of 55-80 wt %, the fermentation temperature is ≥75° C., the fermentation is maintained for more than 5 d, and the total fermentation time is 14-21 d.

Preferably, the native material of humus precursors comprises high-fiber materials or biochar enriched with polar functional groups, and the native material of humus precursors is added at an amount of 10-30% by mass.

Preferably, the fermented material is controlled to have an initial water content of 50-65 wt % and an organic matter content of 65-75 wt %, the highest fermentation temperature is controlled to be 50-75° C., the fermentation is maintained for not less than 15 d, and the total fermentation time is 25-30 d.

Preferably, the humus content of the sludge in step (1) is determined, and the total humus content of the sludge is characterized by a humified carbon content in the range of 120-250 mg/g VS; if the humus content of the sludge before fermentation reaches the range, the humus content of the sludge after fermentation needs to be increased by 2-5 times.

Preferably, the soluble humus content in sludge humus is 25-60 mg/g VS; if the soluble humus content of the sludge reaches the range before fermentation, the soluble humus content after fermentation needs to be increased by 6-15 times.

Preferably, in step (2), the mixing ratio of the sludge to mine surface soil v:v is (3-7):(7-3), the mixing depth of the surface soil is not less than 50 cm, and the mine is remedied for more than 120 d.

Preferably, the remedied mine soil polluted by heavy metals is characterized by optical methods including XRD and XPS, and extraction and determination are carried out according to conventional heavy metal fractionation.

Preferably, the proportion of residual heavy metals in the remedied mine soil polluted by heavy metals is ≥75%.

The mechanism of the disclosure is as follows: the sludge is effectively and stably stabilized through efficient directed humification fermentation. The sludge undergoes mixed fermentation with a hyperthermophile (one or more of *Thermus* sp., *Geobacillus* sp., and *Calditerricola* sp.) to generate a large amount of humus with a variety of polar functional groups, so that a large amount of carbon source can be fixed, and carbon emission in the organic waste treatment process is greatly reduced. The decomposed product is applied to mine soil polluted by heavy metals to induce and accelerate the mineralization and fixation of excessive heavy metals in the mine soil. Pollutional heavy metals on the surface layer of the mine are absorbed and enriched by using the humified product, and the humus can increase the complexation of copper (Cu), cadmium (Cd), chromium (Cr), lead (Pb), Nickel (Ni), arsenic (As) and zinc (Zn) by 20-85%, thereby achieving a significant heavy metal absorption and enrichment effect. After the humified product is enriched with heavy metals, the heavy metals are induced to migrate onto the mine primary minerals of the mine and are mineralized to generate secondary minerals, so that free heavy metals are fixed on the primary minerals, thereby effectively solving the heavy metal scouring pollution in mines.

Compare with the prior art, the disclosure has the following advantages:

1. The ultra-high temperature fermentation time can be significantly shortened by more than 50% (the common ultra-high temperature fermentation needs 49 d), the decontamination, reduction and stabilization of sludge are effectively realized, and the carbon emission in the treatment process of organic wastes is reduced.

2. The humus content of the fermentation product can be increased by more than 2 times, and the soluble humus content can be increased by more than 6 times, so that the requirement on the humus content of the sludge for remedying heavy metal scouring pollution in mines is clearly quantified, and the high-efficiency utilization of sludge is realized.

3. It is determined specifically that the time for mine remediation with the sludge should be more than 120 days. In the operation procedure, it is specified in detail that the mixing ratio v:v is (3-7):(7-3) and the mixing depth is greater than 50 cm. It is clearly defined that the remediation effect is characterized by optical methods including XRD and XPS, and the extraction and determination are carried out according to conventional heavy metal fractionation.

4. The disclosure realizes for the first time the secondary mineralization of heavy metals to achieve passivation and fixation of heavy metals, thereby effectively remedying heavy metal scouring pollution in mines.

DETAILED DESCRIPTION OF THE EMBODIMENTS

The disclosure is described in detail below with reference to the drawings and specific embodiments.

EXAMPLE 1

1. Breeding of Polar Humified Groups

Figure 1:
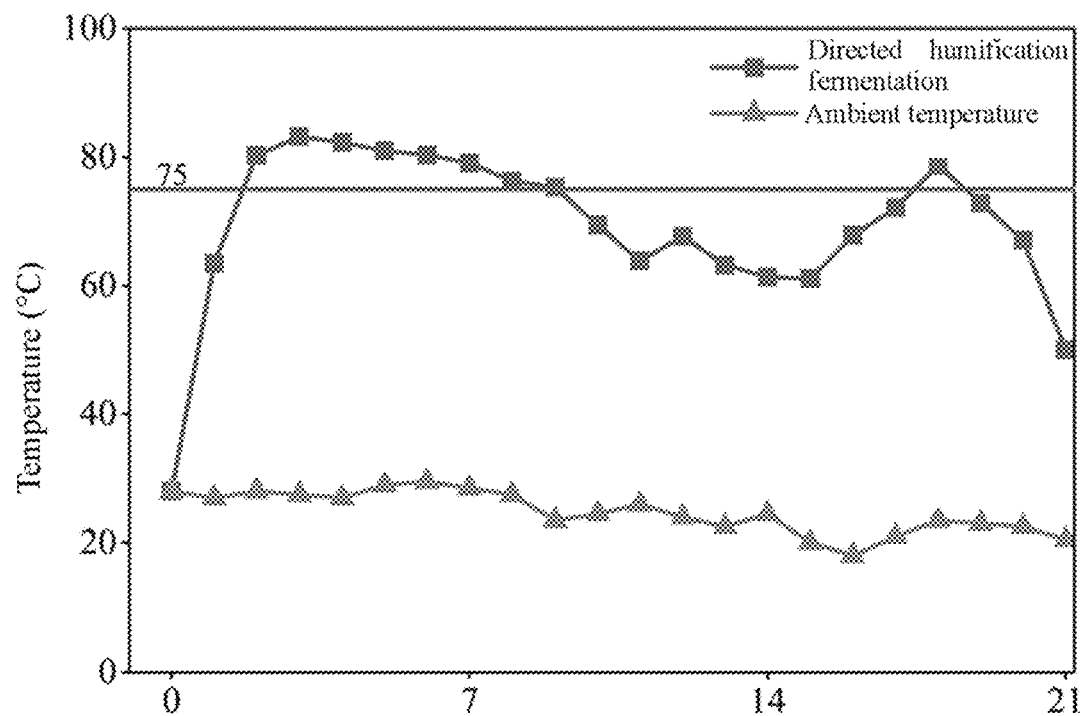
FIG. 1 shows changes in fermentation temperature of an example.

Ultra-high temperature aerobic fermentation was adopted to conduct mixed fermentation of sludge and a hyperthermophile (*Thermus* sp.) with the initial water content controlled at 53.7% and organic matter content at 62.4%. The highest fermentation temperature was 83.2° C. and the fermentation time was 14 d. Then, 20 wt % biochar was added for secondary fermentation for 7 d, and the total fermentation time was 21 d, including 9 d at a temperature ≥75° C. FIG. 1 shows changes in fermentation temperature.

Figure 2:
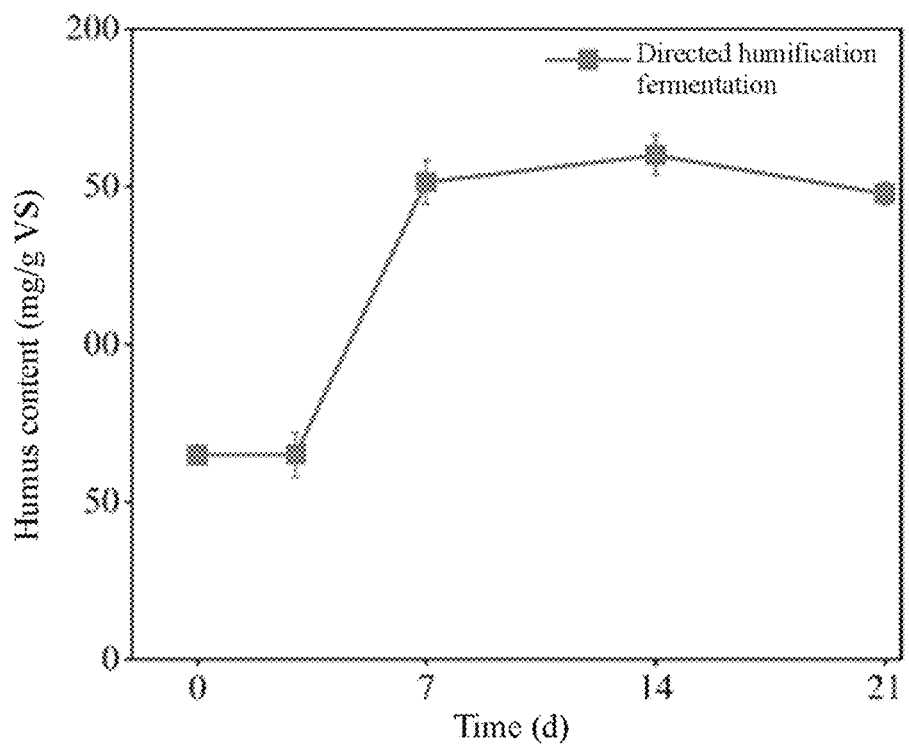
FIG. 2 shows changes in humus content.
Figure 3:
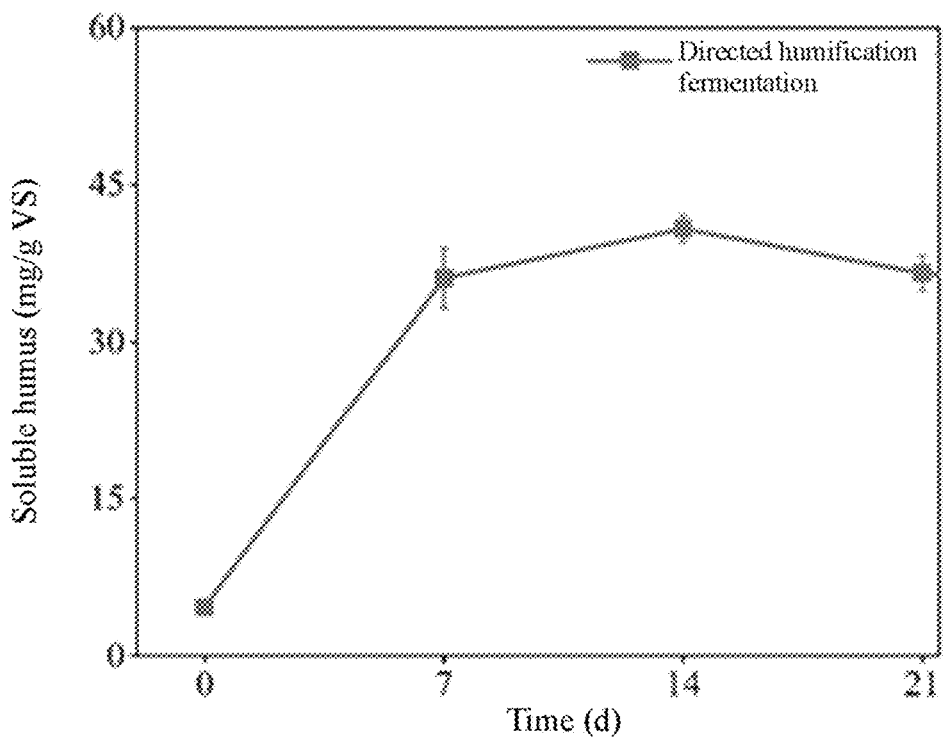
FIG. 3 shows changes in soluble humus content.

2. Determination of the Content of the Polar Functional Groups of the Humified Product The humus content of the sludge before fermentation (characterized by humified carbon content) was 64.7 mg/g VS, and the humus content of the decomposed material in step 1 (characterized by humified carbon content) was 147.6 mg/g VS, meeting the requirements on sludge humus content; the soluble humus content of the sludge before fermentation was 4.7 mg/g VS, and the soluble humus content of the decomposed material in step 1 was 36.6 mg/g VS, thereby meeting the requirement for remediation of heavy metal scouring pollution in mines. FIG. 2 shows changes in humus content and FIG. 3 shows changes in soluble humus content.

3. Method for Remedying Heavy Metal Scouring Pollution in Mines by the Modified Humified Product The humified product of the sludge reaching the standard in step 2 was mixed with the mine soil polluted by heavy metals to remedy the polluted mine surface layer for 180 d, wherein the mixing depth of the mine surface layer soil was 80 cm, and the proportion of the mixed sludge was 50% (v/v).

4. Characterization of Remediation Effect

The surface soil sample in step 3 was detected before and after remediation. As characterized by XRD, on the mine primary mineral albite, in the mine soil sample applied with the humified product of the sludge of the disclosure, chrysocolla, a secondary mineral of heavy metal copper (Cu) was produced. The characteristic peaks of chrysocolla were 12.18°, 18.13°, 34.49° and 36.76°. Additionally, extraction and determination were carried out according to conventional heavy metal fractionation. The initial proportion of heavy metals of residual state in the sample was 76.5%, and the final proportion was 90.1%, demonstrating that the remediation effect was achieved.

In the comparative example, the traditional ultra-high temperature aerobic fermentation was adopted, and the inoculated strain was one or more of the common hyperthermophiles such as *Thermus* sp., *Geobacillus* sp., and *Calditerricola* sp. The initial water content of the compost was 50%-60%, the fermentation was ultra-high temperature fermentation lasting 49 d, and seven cycles of composting were completed. When the fermentation product of the traditional ultra-high temperature aerobic fermentation was applied to the mine soil, no chrysocolla, a secondary mineral of heavy metal copper (Cu), was generated and no characteristic peak was detected, as shown in FIG. 4.

Figure 4:
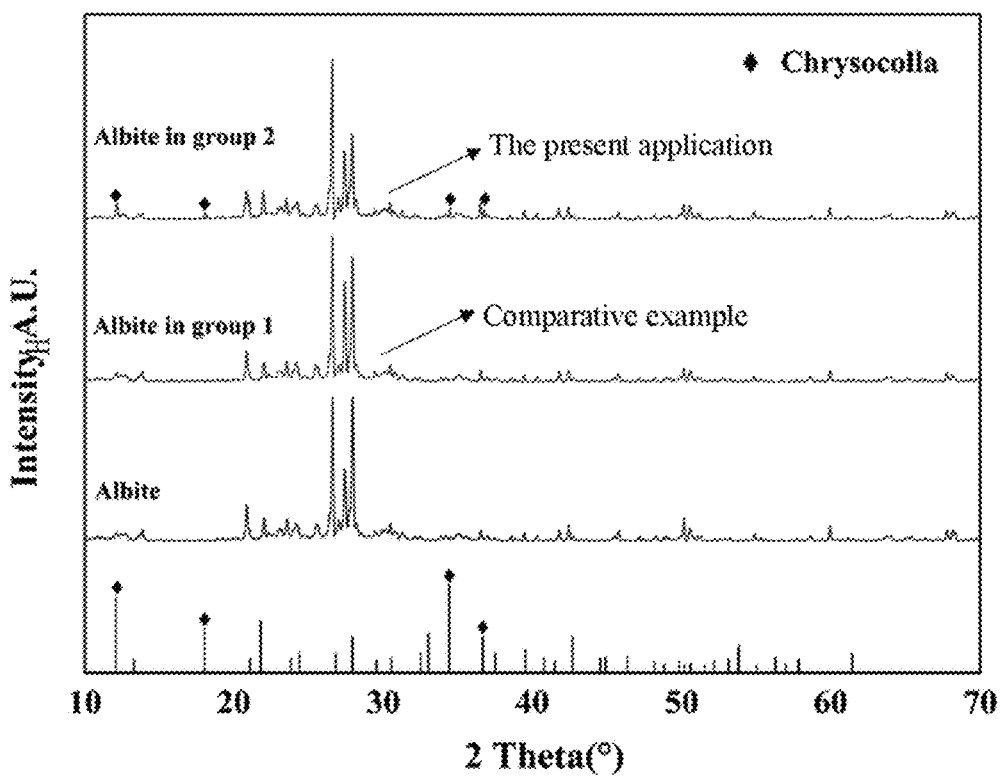
FIG. 4 is the XRD characterization of the copper secondary mineral, i.e., chrysocolla, in the primary mineral albite of the mine.
Figure 5:
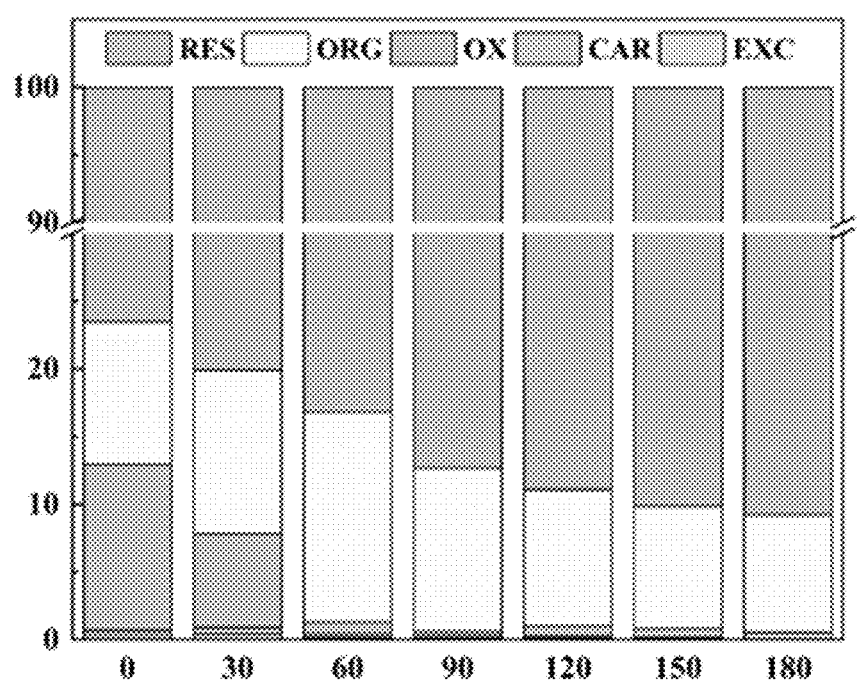
FIG. 5 shows the morphological distribution of heavy metal Cu as a function of remediation time (EXC: exchangeable; CAR: carbonates bound; OX: Fe—Mn oxidized; ORG: organic matters bound; RES: residual).

FIG. 4 is the XRD characterization of chrysocolla, a secondary mineral of copper in the primary mineral albite, and FIG. 5 shows changes in fractionation of heavy metal Cu with remediation time (EXC: exchangeable; CAR: carbonates bound; OX: Fe—Mn oxidized; ORG: organic matters bound; RES: residual).

The above description of the embodiments is to facilitate an understanding and use of the disclosure by those of ordinary skill in the art. It will be apparent to those skilled in the art that various modifications may be readily made to these embodiments and that the general principles described herein may be applied to other embodiments without undue creative work. Accordingly, the disclosure is not limited to the above-described embodiments, and modifications and improvements made by those skilled in the art in light of the disclosure without departing from the scope of the disclosure are intended to be within the scope of the disclosure.

What is claimed is:

1. A method for controlling heavy metal scouring pollution in mines by using a humified product, comprising steps of:
   (1) directed humification fermentation of sludge: sludge and a hyperthermophile undergo a primary mixed fermentation to breed polar humified groups, and the fermented sludge and a native material of humus precursors undergo a secondary mixed fermentation to induce massive production of humus, thereby preparing a modified humified product;
   (2) remediation of heavy metal scouring pollution in mines by the modified humified product: the humified product of the sludge reaching a standard and mine soil polluted by heavy metals are mixed and maintained to remedy the polluted mine.

2. The method for controlling heavy metal scouring pollution in mines by using a humified product according to claim 1, wherein in the primary mixed fermentation in step (1), when the sludge and the hyperthermophile undergo mixed fermentation, the sludge is controlled to have an initial water content of 45-55 wt % and an organic matter content of 55-80 wt %, the highest fermentation temperature is above 75° C. and be maintained for more than 5 d, and the total fermentation time is 14-21 d.

3. The method for controlling heavy metal scouring pollution in mines by using a humified product according to claim 2, wherein the native material of humus precursors comprises high-fiber materials or biochar enriched with polar functional groups, and the native material of humus precursors is added at an amount of 10-30% by mass.

4. The method for controlling heavy metal scouring pollution in mines by using a humified product according to claim 3, wherein in the secondary mixed fermentation in step (1), the fermented sludge is controlled to have an initial water content of 50-65 wt % and an organic matter content of 65-75 wt %, the highest fermentation temperature is controlled to be 50-75° C. and maintained for not less than 15 d, and the total fermentation time is 25-30 d.

5. The method for controlling heavy metal scouring pollution in mines by using a humified product according to claim 1, wherein a humus content of the sludge in step (1) is determined, and a total humus content of the sludge is characterized by a humified carbon content in a range of 120-250 mg/g VS; if the humus content of the sludge before fermentation reaches the range, the humus content of the sludge after fermentation needs to be increased by 2-5 times, thereby completing primary content determination for polar functional groups of the modified humified product of the sludge.

6. The method for controlling heavy metal scouring pollution in mines by using a humified product according to claim 1, wherein a soluble humus content in sludge humus is in a range of 25-60 mg/g VS; if the soluble humus content of the sludge reaches the range before fermentation, the soluble humus content after fermentation needs to be increased by 6-15 times, thereby completing secondary content determination for polar functional groups of the humified product of the sludge; after a total humus content and the soluble humus content are both determined to reach the standard, remediation of heavy metal scouring pollution in mines can be carried out.

7. The method for controlling heavy metal scouring pollution in mines by using a humified product according to claim 1, wherein in step (2), a mixing ratio of the humified product of the sludge reaching the standard to a mine surface soil v:v is (3-7):(7-3), a mixing depth of the mine surface soil is not less than 50 cm, and the mine is remedied for more than 120 d.

8. The method for controlling heavy metal scouring pollution in mines by using a humified product according to claim 1, wherein a remedied mine soil polluted by heavy metals is characterized by optical methods including XRD and XPS, and extraction and determination are carried out according to conventional heavy metal fractionation, wherein the conventional heavy metal fractionation is determined by a first occurrence of characteristic peaks of a certain heavy metal secondary mineral or an enhancement of characteristic peaks of the related heavy metal primary mineral.

9. The method for controlling heavy metal scouring pollution in mines by using a humified product according to claim 8, wherein a proportion of residual heavy metals in the remedied mine soil polluted by heavy metals is ≥75%.

* * * * *